March 25, 1941.　　　　E. L. ROSE　　　　2,236,489
POWER TRANSMISSION
Filed March 28, 1936　　　　4 Sheets-Sheet 2

INVENTOR
EDWIN L. ROSE
BY Ralph L. Tweedale
ATTORNEY

March 25, 1941.    E. L. ROSE    2,236,489
POWER TRANSMISSION
Filed March 28, 1936    4 Sheets-Sheet 3
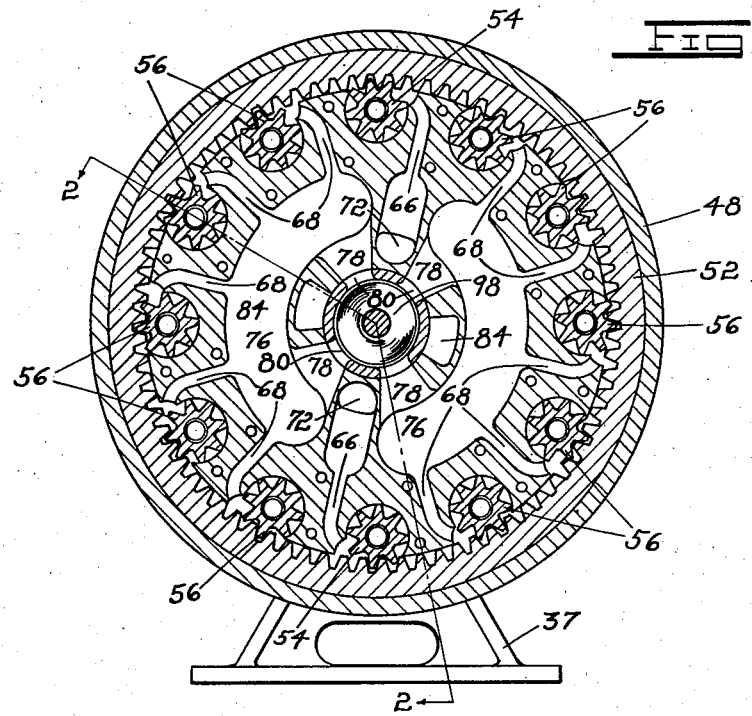
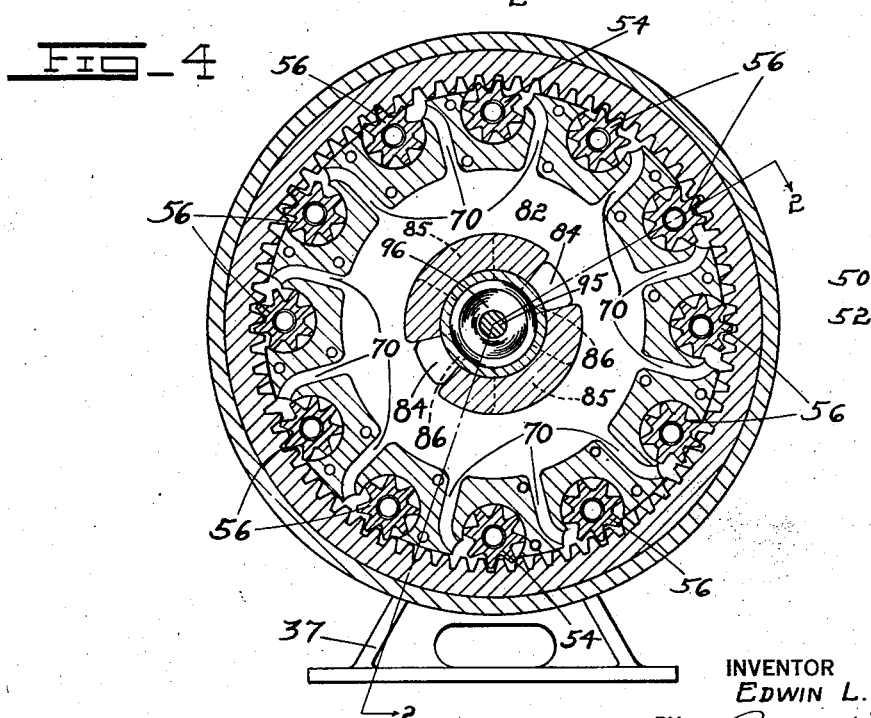
INVENTOR
EDWIN L. ROSE
BY
ATTORNEY

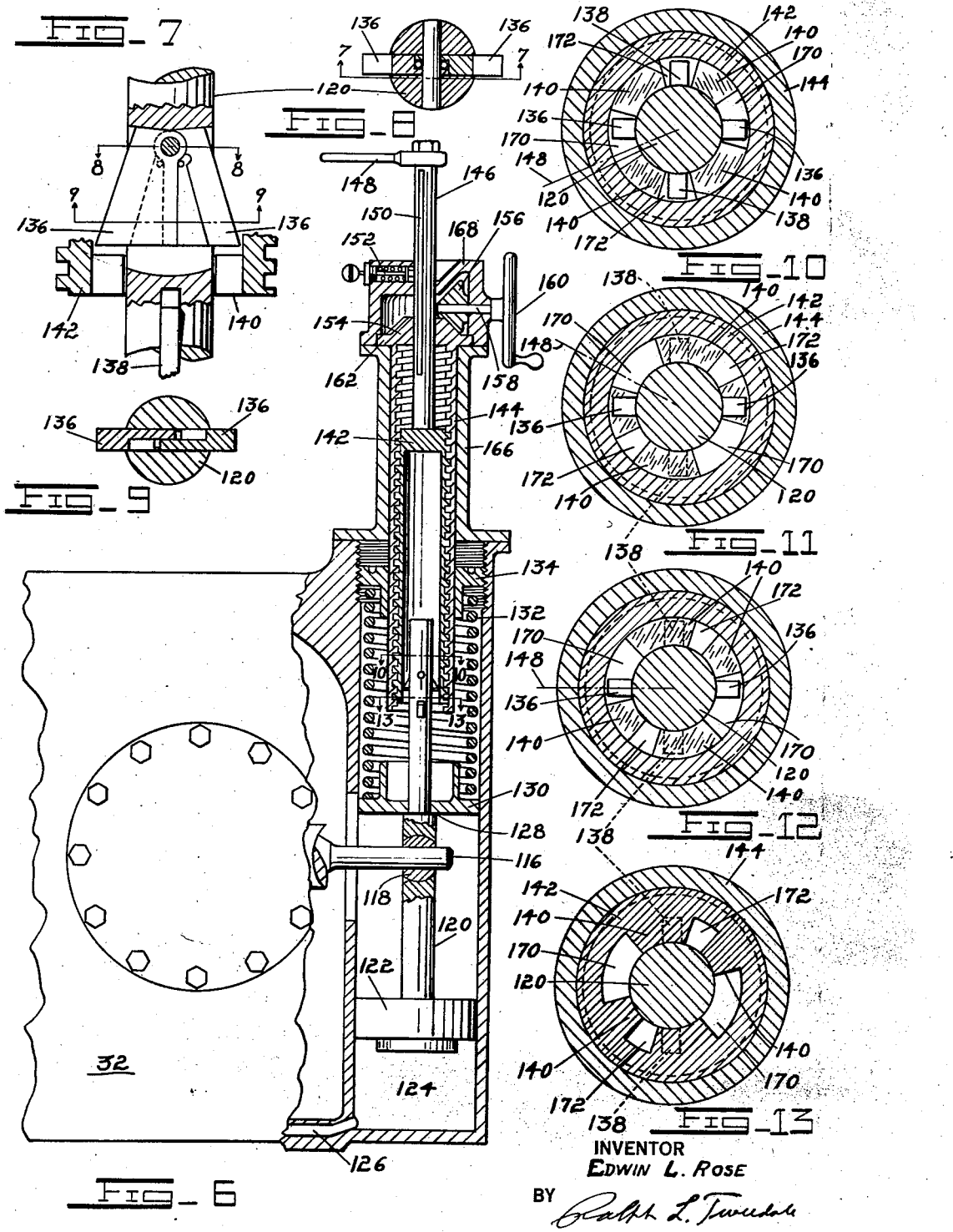

Patented Mar. 25, 1941

2,236,489

UNITED STATES PATENT OFFICE 2,236,489

POWER TRANSMISSION

Edwin L. Rose, Waterbury, Conn., assignor to The Waterbury Tool Company, Waterbury, Conn., a corporation of Connecticut Application March 23, 1936, Serial No. 71,419

11 Claims. (Cl. 254—172)

This invention relates to power transmissions and more particularly to a novel power transmission device and control therefor particularly adapted to hoisting an object while relative movement between the object and the hoisting device is occurring. A device of this character is useful, for example, on ship board for the purpose of lifting floating objects such as boats, airplanes, etc., from a rough sea. The invention is shown and described as adapted for this use, although it will be understood that the invention may be used for other purposes.

In lifting floating objects from rough seas, particularly objects of a comparatively fragile character, such as a seaplane, it is necessary to insure that the means, usually a cable, which connects the object to the hoist is maintained taut at all times while the object is moved up and down relative to the hoist by the action of the waves. Unless this result is insured at all times, it is possible and frequently occurs that when the hoist is operated to lift the object out of the water, a sudden jerk is given to the object and the connecting means, which may be of sufficient magnitude to rupture the connecting means or to damage the object by pulling out the ring, or other facilities for attachment to the connecting means. Devices heretofore proposed for solving this problem, have been so constructed as to require a difficult manual operation of the controls, when changing from constant tension to hoisting, if dangerous jerks on the object are to be avoided. Furthermore, such devices under certain conditions of operation have been known to permit slack and consequent jerking to occur.

It is an object of the present invention to provide a power transmission device for driving a hoist and including control devices for preventing a sudden jerk upon the object being hoisted under any condition of operation.

A further object is to provide a control system for a device of this character by which the operation of changing over from a condition at which a predetermined tension is maintained in the hoisting connection to the condition of positive hoisting may be made only at the instant when the hoisting speed at constant tension falls to the value at which positive hoisting is done.

A further object is to provide a control for a device of the character described providing means for taking up slack which might occur due to wave action after hoisting is started, that is to say, to provide a control which, during hoisting, has no upper limit to the tension which may be maintained on the hoisting connection but maintains a lower limit of tension thereon.

It is also an object to provide such a control means which operates in response to the loading and unloading of the hoisting connection by the full weight of the object being hoisted and does not require manual operation.

A further object is to provide a control device for a variable displacement pump in which the displacement may be varied either in response to working pressure to maintain a substantially constant pressure or may be controlled to maintain the pressure above a predetermined minimum and to provide manual means for selectively transferring the control from one condition to the other.

Further objects and advantages of the present invention will be apparent from the following description, reference being had to the accompanying drawings wherein a preferred form of the present invention is clearly shown.

In the drawings:

Fig. 3 is a cross section on line 3—3 of Fig. 2.

Fig. 4 is a cross section on line 4—4 of Fig. 2.

Fig. 6 is a fragmentary sectional view of a control mechanism for the pump illustrated in Fig. 5.

Fig. 7 is a fragmentary sectional view of a latch mechanism taken on line 7—7 of Fig. 8.

Fig. 8 is a fragmentary sectional view on line 8—8 of Fig. 7.

Fig. 9 is a fragmentary sectional view on line 9—9 of Fig. 7.

Fig. 10 is a fragmentary sectional view on line 10—10 of Fig. 6 showing the parts in one position.

Fig. 11 is a view corresponding to Fig. 10 showing the parts in a second position.

Fig. 12 is a view corresponding to Fig. 10 showing the parts in a third position.

Fig. 13 is a fragmentary cross section on line 13—13 of Fig. 6.

Figure 1:
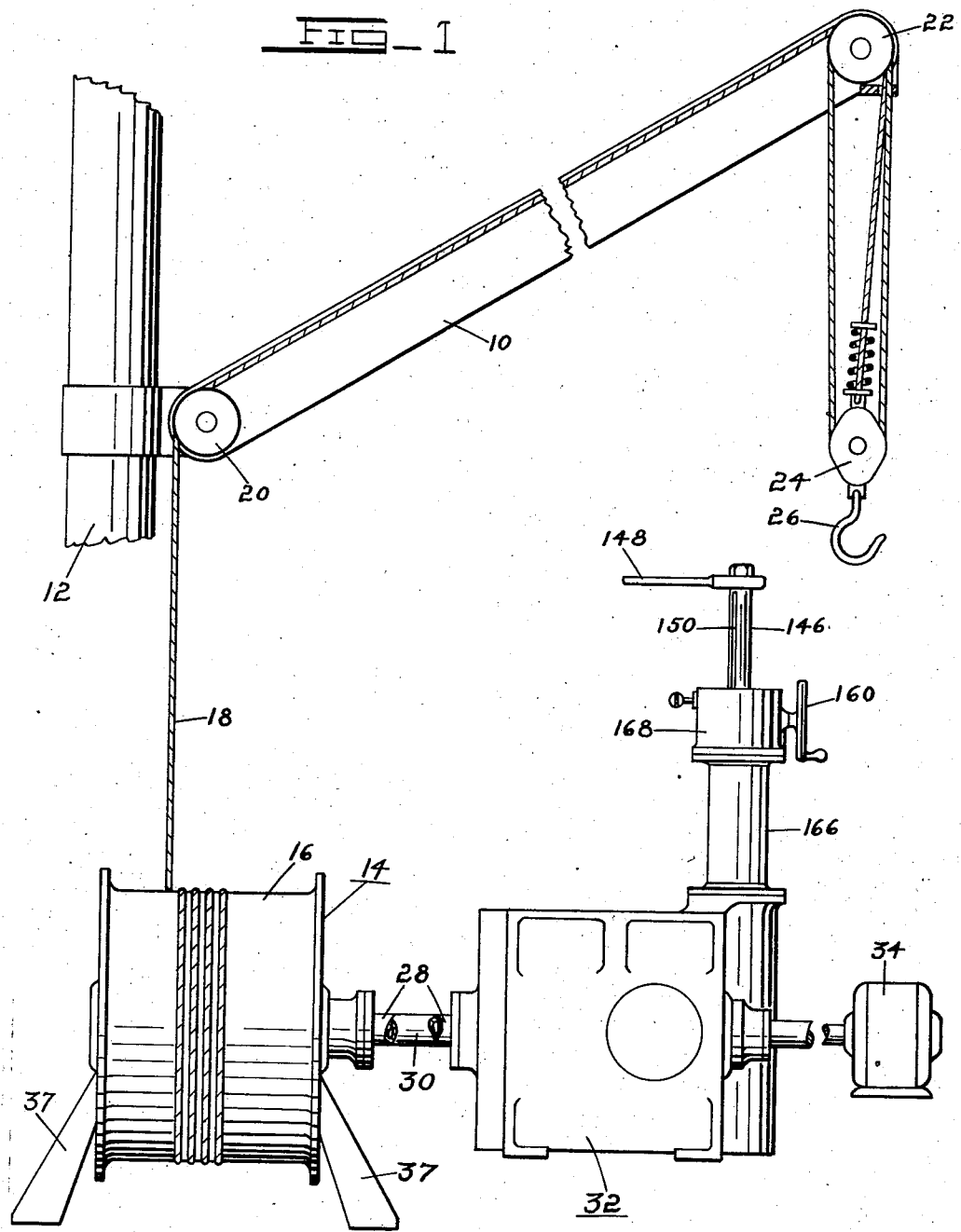
Fig. 1 is a side view of a hoist embodying a preferred form of the present invention.

Referring now to Fig. 1 there is illustrated a hoist comprising a crane boom 10 pivotally attached to a mast 12 of a ship. A winch 14 is suitably mounted on the deck of the ship and has a drum 16 over which is wound a cable forming part of a connecting means between the winch and the object to be lifted. Cable 18 is threaded over pulleys 20 and 22 and through a pulley block 24 to which is attached a hook or other load attaching means 26. The drum 16 includes a hydraulic motor incorporated in the interior of the drum by which the drum may be rotated in either direction. This motor which will be described in detail hereafter is of variable displacement and a pressure responsive valve is provided within the drum for controlling the effective displacement of the winch operating motor. Supply and return conduits 28 and 30 connect the hydraulic motor to a variable displacement pump 32, the pump being operated by a suitable prime mover such as a substantially constant speed electric motor 34. The pump 32 may be of any suitable construction and is illustrated as of the well-known "Waterbury" type which includes a tilting box 36 by means of which the piston stroke and consequently the displacement of the pump may be varied.

Figure 2:
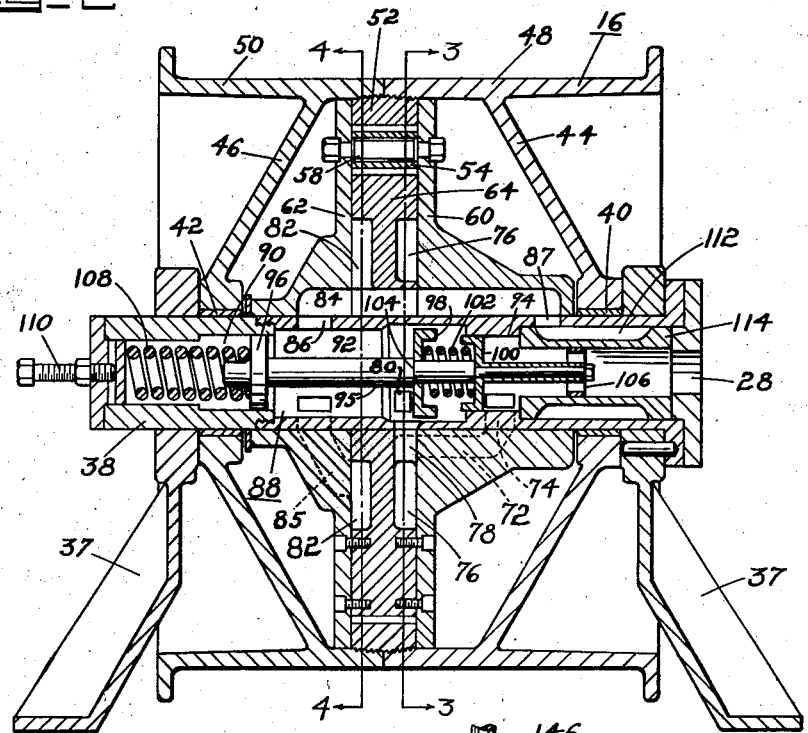
Fig. 2 is a cross section on line 2—2 of Figs. 3 and 4 showing a combined fluid motor and hoist forming part of the present invention.
Figure 5:
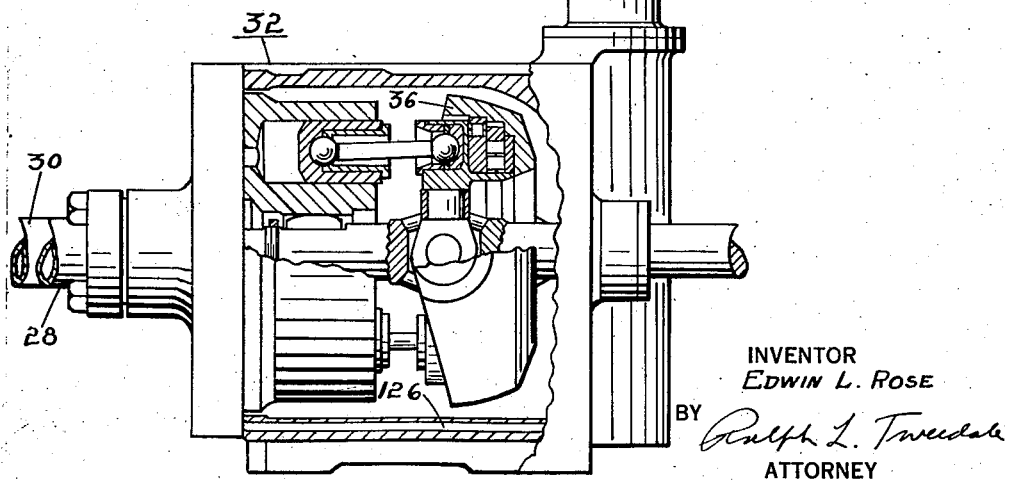
Fig. 5 is a side view partly in section of a variable displacement pump embodying the present invention.

Referring now to Figs. 2, 3, and 4, the internal construction of the fluid motor is there illustrated. The winch 14 includes a pair of pedestals 37 upon which is rigidly mounted a stationary central tubular supporting member 38. The drum 16 is pivotally mounted on the tubular support 38 by means of bearings 40 and 42. The drum 16 is made in two halves each including a dished imperforate web 44, and 46 connecting the rims 48 and 50 with the bearings 40 and 42. The two halves of the drum are rigidly secured by threads to an internal ring gear 52. Meshing with the ring gear 52 is a set of pinions 54 and 56 (Fig. 3), each of which is journalled upon a stationary trunnion 58. The sides of the ring gear 52 and the ends of the pinions 54 and 56 are enclosed by a pair of stationary plates 60 and 62 which are rigidly secured to the supporting member 38. The space between the plates 60 and 62 which is not occupied by the ring gear 52 or the pinions 54 and 56 is occupied by a filler block 64 to which the plates 60 and 62 are rigidly bolted.

The block 64 is formed with a plurality of fluid passages communicating with the meshing points of the various pinions with the ring gear to provide suitable fluid inlet and outlet connections. For this purpose passages 66 (Fig. 3) communicate with the pinions 54 on one side of their meshing points with gear 52, while passages 68 communicate with the pinions 56 at the same side of their meshing points with the gear 52. Passages 70 (Fig. 4) communicate with each of the pinions 54 and 56 at the opposite sides of their meshing points with gear 52. Passages 66 communicate by means of passages 72 with the interior of the supporting member 38 through holes 74 formed therethrough. Passages 68 communicate with chambers 76 each of which in turn communicates with the interior of the supporting member 38 by passages 78 formed in the block 64 and passages 80 formed in the supporting member 38. The passages 70 communicate with a chamber 82 which in turn communicates by means of passages 84 and 85, and holes 86 and 87 in the supporting member 38 with the interior of the latter. Within the hollow interior of the supporting member 38 there is mounted a pressure responsive valve generally designated as 88 for controlling the path of fluid through the fluid motor.

Valve 88 comprises a central bore having portions 90, 92 and 94 of different respective diameters. Portion 90 is of the smallest diameter and the portion 92 the largest while the portion 94 is of intermediate diameter. Freely slidable within the central bore is a valve member 95 carrying pistons 96, 98 and 100 fitting the bores 90, 92 and 94 respectively. The piston 98 is freely slidable on the valve member 95, a spring 102 normally holding the piston 98 against a shoulder 104 formed on the member 95. Piston 100 carries a guide spider 106 for guiding the righthand end of the member 95 when the piston 100 is out of the bore 94. A spring 108 is mounted in the left-hand end of the bore 90 to urge the valve member 95 to the right and is adjustable by means of an adjusting screw 110. The passages 80 communicate with the central valve bore at an enlarged chamber between the portions 92 and 94. The passages 74 communicate with the central valve bore at the portion 94 while the passages 86 communicate with the central valve bore at the portion 92. The passage 87 communicates with an annular passage 112 formed by a sleeve member 114 which also forms a guide for the spider 106. Passage 112 communicates with the return conduit 30 through passages, not shown, formed in the right-hand pedestal 37. Supply conduit 28 communicates with the bore 94 through the central passage in member 114.

The operations of the parts shown in Figs. 2, 3, and 4 is such that if fluid under pressure be supplied through the conduit 28 to the right-hand end of the central bore of the valve 88 with the parts in the position illustrated in Fig. 2, a passage is constantly open to the two pinions 54 through passages 74, 72 and 66. So long as the pressure existing in conduit 28 and acting on piston 100 is insufficient to overcome the force of the spring 108 holding the parts in the position shown in Fig. 2, the entire quantity of fluid supplied through the conduit 28 flows to the two pinions 54 and causes them and the ring gear 52 to revolve clockwise in Fig. 3. The pinions deliver the fluid supplied to them to conduits 70 from which it flows through chamber 82 and passages 84, 85, 87 and 112 to the return conduit 30. The drum is thus caused to revolve clockwise in Fig. 3.

During such movement the pinions 56 and ring gear 52 act as gear pumps withdrawing fluid from passages 68 and delivering it through passages 78, chamber 82, passages 84, 85, and 86, portion 92 of the central valve bore, passages 80 and 78 to chambers 76, and passages 68. This circuit is of substantially negligible resistance so that the ten pinions 56 are by-passed and ineffective so far as operation of the drum 16 is concerned. For a given quantity of fluid supplied through the conduit 28, the speed of operation of the drum 16 under these conditions is therefore comparatively high since the entire quantity of fluid supplied to the hydraulic motor is operative upon only two pinions thereof and the effective displacement of the motor is consequently small. While the hoist may be operated at high speed under these conditions, the load which it may handle is comparatively limited. As soon as the load increases to a predetermined value which is determined by the area of the piston 100 and the force exerted by the spring 108, the piston 100 lifts the entire valve assembly to open communication between conduit 28 and passages 80. Since this action takes place while the hoist is operating upon two pinions, the quantity of fluid returning from all ten pinions through the passage 80 is greater than the amount withdrawn from conduit 30 by the pump 32. The excess quantity is permitted to by-pass from portion 92 of the central valve bore to the passages 80 by pushing the piston 98 to the right on stem 95 against the spring 102 until such time as the entire quantity of fluid returning from the twelve pinions is taken in by the pump through the conduit 30.

At this time the piston 98 moves completely into portion 92 of the central valve bore, thus effectively sealing the high pressure fluid in the portion 94 from the low pressure fluid in the portion 92. Under this condition the fluid is distributed to all twelve of the pinions 54 and 56. The path of the fluid to and from the pinions 54 is the same as that previously described. The path of the fluid to and from the pinions 56 is the same as the by-pass path previously described except that fluid is supplied to the passage 80 from the portion 94 of the central valve bore and fluid returning through the passages 84 and 85 goes to the return conduit 30 through passages 87 and 112.

Whenever the pressure in conduit 28 is reduced to a predetermined value lower than the value at which valve 95 moved to the left, the valve moves back to the position illustrated in Fig. 2. The difference in the points at which the valve lifts and falls is due to the difference in area between the pistons 100 and 98. The piston areas may be so chosen with regard to the displacement ratio of the motor, in this case one to six, that the difference in cable tension between the opening and closing point may be anything desired. For smoothness in change-over it is desirable that the areas be such that the cable tension at opening is lower than at closing, thus giving a range of cable tension at which the ten pinions operate on a fluid pressure which is reduced by throttling at the valve 88. Thus if the areas are such that the valve 95 rises at three times the pressure at which it falls with a one to six displacement ratio, the cable tension required to maintain the valve fully open will be twice the tension required to crack the valve open.

Referring now to Figs. 6 through 13 inclusive, the control mechanism for the pump 32 is illustrated. The tilting box 36 carries an operating stud 116 to which is connected by means of a sliding and pivoting joint 118 a vertically slidable operating stem 120. The lower end of the stem 120 is formed with a piston 122 slidable in a cylinder bore 124 which is in communication with the supply conduit 28 through a passage 126 formed in the casing of the pump. The stem 120 is formed with a shoulder 128 against which a spring plate 130 abuts. A spring 132 has its lower end abutting the spring plate 130 and its upper end abutting a spring plate 134 adjustably secured to the pump casing. The stem 120 projects through the spring plate 130 and carries two sets of yieldable latches 136 and 138 (see Figs. 7, 8 and 9). the latches 136 and 138 are disposed at right angles to one another and vertically spaced so that the latches 136 may engage the upper side of a ledge 140 while the latches 138 may engage the lower side thereof. The ledge 140 is formed integrally with a tubular member 142, the outside of which is screw threaded for engagement with an interiorly threaded sleeve 144.

The tubular member 142 carries an upwardly projecting stem 146 having an operating handle 148 at its upper end. The stem 146 is formed with three longitudinal grooves 150 by which it may be locked in any one of three angularly spaced positions by means of a spring pressed, manually operable detent 152. The sleeve 144 carries a bevel gear 154 at its upper end which meshes with a bevel gear 156 carried by a shaft 158 which may be operated by a hand wheel 160. A flange 162 which is rotatably mounted between a supporting sleeve 166 and a cover member 168 restrains the sleeve 144 against vertical movement.

The ledge 140 is interrupted at points 170 and 172 (see Fig. 13) in order to permit the latches 136 and 138 to pass the ledge in either direction of movement in certain positions of the operating handle 148. Thus, in the position illustrated in Fig. 10 which may be called the constant tension position, both the latches 136 and 138 are opposite the portions 170 and 172 respectively so that the stem 120 may reciprocate freely through its full range of movement. In the position illustrated in Fig. 11 which may be termed the manual control position, both the latches 136 and 138 are opposite portions of the ledge 140 so that the tubular member 142 may be rigidly secured to the stem 120. In the position illustrated in Figs. 12 and 13 which may be termed the pick-up position, the interrupted portions 170 are in register with the latches 136 while portions of the ledge 140 are in register with the latches 138. In this position the stem 120, after it has once moved the latches 138 downwardly past the ledge 140, is prevented from moving upwardly again beyond the point where the latches 138 engage the bottom of the ledge 140 although the stem 120 is free to move downwardly from this position at any time.

It will be seen that in the constant tension position of the handle 148, the position of the tilting box 36 is under the sole control of the piston 122 and the spring 132. In the manual control position of the handle 148, the position of the tilting box 36 once the latches 136 and 138 have been engaged with the ledge 140 is under the sole control of the hand wheel 160. In the pick-up position the movement of the tilting box upwardly is limited by the position of the ledge 140 so long as the working pressure of the pump is sufficient to overcome the force of the spring 132 and hold the latches 138 in engagement with the ledge 140. Upon a drop in pressure below this point, the position of the tilting box is determined by the pressure through the medium of the piston 122 and the spring 132.

It will be noted that if the handle 148 is turned from constant tension position to pick-up position at an instant when the latches 138 are above the ledge 140 that the tilting box remains under the control of the piston 122 and spring 132 until such time as the stem 120 has moved downwardly to bring the latches 138 beneath the ledge 140 and has again started upwardly to engage the latches 138 with the ledge 140.

In operation of the device as a whole the motor 34 is placed in operation, the lever 148 is placed in manual control position and the hand wheel 160 is turned to bring the tilting box into neutral or zero displacement position.

When it is desired to lift a seaplane floating alongside the ship (the ship and the plane being either traveling through the water at the same rate or both standing still except for wave movements), a light throwing line is attached to the hook 26 and thrown overboard to the pilot of the airplane. With handle 148 in manual control position the hand wheel 160 is then turned to operate the tubular member 142, stem 120 and tilting box 36 upwardly to pump fluid in the reverse direction through the motor within the hoist drum 16 and thus cause the hook 26 to be lowered to the plane. The pilot then engages the hook with a ring or other attaching means by which the plane is to be lifted and the operator on deck moves the control handle 148 to constant tension position. This movement frees both the latches 136 and 138 from the ledge 140 and since there is no lead on the cable 18 and consequently no pressure in the cylinder 124, the spring 132 forces the stem 120 downwardly to move the tilting box 36 to full stroke in the hoisting direction. The valve 88 is at this time in the position illustrated in Fig. 2 due to the low pressure in conduit 28. As a result cable 18 is wound in at a rapid rate. As soon as the slack is taken up sufficiently to produce a light tension on the same, that is, a light load on the winch, the pressure in conduit 28 and cylinder 124 rises to a value sufficient to overcome the force of the spring 132 and moves the tilting box to neutral position. As the tension increases and decreases due to alternate raising and lowering of the plane relative to the boom 10 by the wave action, the pressure in conduit 28 and cylinder 124 rises and falls causing a corresponding movement of the tilting box 36. Thus, when the pressure rises due to a wave receding and permitting the plane to fall, the stem 120 is moved upwardly bringing the pump into stroke in a lowering direction causing cable to be paid out at a rate corresponding to the pressure. The rate of the spring 132 and the preloading thereof is such that the variation in spring pressure between full stroke in the hoisting direction and full stroke in the lowering direction is small compared to the average spring pressure so that the tension in the cable is maintained at a value which is very nearly constant.

When it is desired to hoist the plane from the water, the handle 148 is moved to pick-up position. This may be done without regard as to whether the plane is rising or falling relative to the boom at the instant during which the handle 148 is turned. Thereafter as soon as the plane rises on a wave and its upward speed, as it approaches the crest thereof, falls to the point corresponding to the setting of the tubular member 142, the stem 120 is prevented from rising further by engagement of the latches 138 with the ledge 140. Before shifting the handle 148 to pick-up position, the operator will have set the tubular member 142 at a position corresponding to the hoisting speed at which he desires to pick the plane off the water. This may be done by operating the handwheel 160 while lever 148 is in constant tension position. In the latter position the tubular member 142 is, of course, unconnected to the tilting box 36. It will be seen that, even if the handle 148 be turned to pick-up position while the plane is descending on a wave, it is impossible to produce an undesirable jerk on the cable 18 because the cable is permitted to pay out and haul in as required for the maintenance of the constant tension until the plane again rises on a wave and the upward speed falls off until it reaches the speed at which it is desired to pick the plane off the water.

As soon as the weight of the plane comes on the hook 26, the pressure in conduit 28 rises to a point above the pressure which is maintained during constant tension operation and the valve 88 lifts as previously described causing the fluid supplied to the hoist motor to be distributed to all twelve of the pinions rather than to the two pinions 54. The speed of hoisting is thereby further decreased and the load which may be lifted with a given pressure in the conduit 28 is correspondingly increased. If the wave amplitude is small so that the amplitude of movement of the tilting box 36 during constant tension is small, the operator may be forced to set the tubular member 142 at a position corresponding to a very small stroke in the hoisting direction. In this case after the plane has been picked up and the valve 88 has shifted to twelve pinion operation of the hoist motor, the hand wheel 160 may be moved to increase the stroke in the hoisting direction so as to raise the plane at a faster rate.

It will be seen that by means of the handle 148, the winch driving means may be rendered subject to three different methods of control. When the handle 148 is in constant tension position (Fig. 10), the control is entirely load responsive. The speed of the winch driving means is automatically varied by the piston 122 and spring 132 to follow the movements of the plane on the water in such a manner that the cable tension is maintained substantially constant. When the handle 148 is in pick-up position, the control is load responsive only below a predetermined low value of load. The speed of the winch driving means is subject to control by the piston 122 and spring 132 at the lower values of cable tension but as the cable tension increases with the decrease in upward speed of the plane, the latches 138 prevent further decrease in upward speed of the winch. Of necessity, therefore, the load on the winch increases to the value corresponding to full weight of the plane. When the handle 148 is in manual control position, the winch driving means is subject entirely to manual control through the handwheel 160.

If at any time after the plane has been picked off the water a larger wave strikes the bottom of the plane and raises it faster than it is being hoisted, the valve 88 begins to shift to two pinion operation at a cable tension value substantially twice the tension normally maintained during constant tension operation by the piston 122 and spring 132. Thus, the speed of hoisting is increased and the cable is maintained taut even though the plane be lifted by the wave faster than the normal hoisting speed. As soon as the upward speed of the wave drops to the hoisting speed, valve 88 again opens due to the increased pressure and hoisting is continued as before. Should an unusually large wave strike the ship immediately after hoisting has started it is possible that the operation of the winch motor on two pinions with the tilting box set at the position where latches 138 are against the ledges 140, may not be fast enough to keep the cable taut. In such an event the stem 120 is free to descend, increasing the hoisting speed as required to keep the cable taut. Since the shift to two pinion operation is made at a higher cable tension than that at which stem 120 is permitted to descend, it will be seen that stem 120 stays up against the member 142 as long as valve 88 can take care of the increased speed requirements and, likewise, returns up before valve 88 begins to shift to twelve pinion operation.

When it is desired to stop hoisting the plane so that it may be swung inboard, the hand wheel 160 is operated to bring the pump 32 to zero stroke and by further movement the pump may be brought into stroke in a lowering position and the plane lowered to the deck. At any time between the time when the plane is sufficiently high above the water so that the highest possible wave cannot reach it and the time when the plane is set down on the deck, the lever 148 may be thrown to manual control position in which the stem 120 is locked to the tubular member 142 for movemnet therewith in both directions. Thereafter cable 18 may be paid out to disengage the hook 26 from the ring on the plane and the cycle of operation repeated as desired.

While the form of embodiment of the invention as herein disclosed, constitutes a preferred form, it is to be understood that other forms might be adopted, all coming within the scope of the claims which follow. It will also be understood that where the claims define an object subject to varying external forces counteracting the pull (of the device) that this and similar expressions refer to conditions not only where the external forces are acting in a direction opposite to the pull of the device on the object but also where the external forces may be, at times, of opposite sign and assisting the pull of the device.

What is claimed is as follows:

1. In a device for pulling on an object while subject to varying external forces counteracting the pull the combination of a winch, variable speed means for driving the winch, automatic means responsive to load on the winch for controlling the speed and direction of the driving means to maintain a substantially constant, light load on the winch, additional means for controlling the speed and direction of the driving means independently of the load and a single control member for rendering the driving means subject to control either entirely load responsive, or load responsive only below a predetermined low value of load, or entirely independent of load.

2. In a device for pulling on an object while subject to varying external forces counteracting the pull the combination of a winch, variable speed means for driving the winch, automatic means responsive to load on the winch for controlling the speed and direction of the driving means to maintain a substantially constant, light load on the winch, means for limiting the operation of said automatic means to a range of speed above a selected minimum pulling speed and manually operable means for rendering said limiting means effective only after the automatic means has brought the speed of the winch into said limited range.

3. In a device for pulling on an object while subject to varying external forces counteracting the pull the combination of a winch, variable speed means for driving the winch, automatic means responsive to load on the winch for controlling the speed and direction of the driving means to maintain a substantially constant, light load on the winch, means for limiting the operation of said automatic means to a range of speed above a selected minimum pulling speed, manually operable means for rendering said limiting means effective only after the automatic means has brought the speed of the winch into said limited range, and additional means for controlling the speed of the winch independently of the load.

4. In a device for pulling on an object while subject to varying external forces counteracting the pull the combination of a winch, variable speed means for driving the winch, automatic means responsive to load on the winch for controlling the speed and direction of the driving means to maintain a substantially constant, light load on the winch, means for limiting the operation of said automatic means to a range of speed above a selected minimum pulling speed, manually operable means for rendering said limiting means effective only after the automatic means has brought the speed of the winch into said limited range, and additional means for controlling the speed of the winch independently of the load, said last mentioned means including mechanism operable to vary the minimum pulling speed to which the winch is limited when the limiting means is effective.

5. In a device for pulling on an object while subject to varying external forces counteracting the pull the combination of a winch, variable speed means for driving the winch, automatic means responsive to load on the winch for controlling the speed and direction of the driving means to maintain a substantially constant, light load on the winch, means manually operable for causing the winch to positively pull in the object at a predetermined pulling speed, said means being ineffective to start pulling until the automatic means has reduced the speed to said predetermined pulling speed, and additional means for selectively varying said predetermined pulling speed.

6. In a device for pulling on an object while subject to varying external forces counteracting the pull the combination of a winch, variable speed means for driving the winch, automatic means responsive to load on the winch for controlling the speed and direction of the driving means to maintain a substantially constant, light load on the winch, means manually operable for causing the winch to positively pull in the object at a predetermined pulling speed, said means being ineffective to start positive pulling until the automatic means has reduced the speed to said predetermined pulling speed, and additional means for selectively varying said predetermined pulling speed, said last means including mechanism operable for manually controlling the speed and direction of the winch independently of the load.

7. In a device for pulling on an object while subject to varying external forces counteracting the pull the combination of a winch, variable speed fluid power transmission means for driving the winch, automatic means responsive to load on the winch for controlling the speed and direction of the driving means to maintain a substantially constant, light load on the winch, means manually operable for causing the winch to positively pull in the object at a predetermined pulling speed, said means being ineffective to start positive pulling until the automatic means has reduced the speed to said predetermined speed, and additional means for selectively varying said predetermined hoisting speed.

8. In a device for pulling on an object while subject to varying external forces counteracting the pull the combination of a winch, variable speed fluid power transmission means for driving the winch, automatic means responsive to load on the winch for controlling the speed and direction of the driving means to maintain a substantially constant, light load on the winch, means manually operable for causing the winch to positively pull in the object at a predetermined pulling speed, said means being ineffective to start pulling until the automatic means has reduced the speed to said predetermined pulling speed, and additional means for selectively varying said predetermined pulling speed, said last means including mechanism operable for manually controlling the speed and direction of the winch independently of the load.

9. In a crane for picking up objects floating in a seaway the combination of a winch drum, a cable windable on the drum, and having means for attachment to a floating object, a fluid motor for driving the winch drum, a variable displacement pump for supplying fluid to the fluid motor, means for driving the pump, and fluid pressure responsive means for controlling the pump displacement to maintain a substantially constant light tension in the cable prior to lifting the object from the water, whereby the cable is maintained taut at the instant the object is picked off the seaway.

10. In a device for pulling on an object while subject to varying external forces counteracting the pull the combination of a winch, variable speed means for driving the winch, automatic means responsive to load on the winch for controlling the speed and direction of the driving means to maintain a substantially constant, light load on the winch, means for preventing said automatic means from causing the winch to operate in a paying-out direction, and manually operatable means for rendering said last means effective only after the automatic means has caused the winch to operate in a winding-in direction.

11. In a device for pulling on an object while subject to varying external forces counteracting the pull the combination of a winch, variable speed means for driving the winch, automatic means responsive to load on the winch for controlling the speed and direction of the driving means to maintain a substantially constant, light load on the winch, means for preventing said automatic means from causing the winch to operate in a paying-out direction, and manually operatable means for rendering said last means effective only after the automatic means has caused the winch to operate in a winding-in direction, and additional means for controlling the speed of the winch independently of the load.

EDWIN L. ROSE.